UNITED STATES PATENT OFFICE.

THOMAS A. EDISON, OF NEWARK, NEW JERSEY, ASSIGNOR TO HIMSELF AND GEORGE HARRINGTON, OF WASHINGTON, D. C.

IMPROVEMENT IN SOLUTIONS FOR CHEMICAL TELEGRAPH-PAPER.

Specification forming part of Letters Patent No. 160,404, dated March 2, 1875; application filed June 1, 1874.

*To all whom it may concern:*

Be it known that I, THOMAS A. EDISON, of Newark, in the county of Essex and State of New Jersey, have invented an Improvement in Chemical Paper for Receiving-Telegraph Instruments, of which the following is a specification:

I make use of a tincture of logwood to moisten the paper. I find that with an iron pen a mark is made upon the paper when the current passes. There is no mark when the electric circuit is broken.

Logwood is peculiarly sensitive to color in the presence of iron, and the electric action develops the color.

I find it advantageous to use chloride of sodium in the solution of tincture of logwood to promote the conductivity of the paper, but muriate of ammonia is preferable for this purpose. By adding to the aforesaid solution of logwood a small quantity of sulphate of iron, the solution is of such a light color that the paper remains nearly white, and the mark will be produced by a platina pen or stilus, to which the negative pole is connected.

I claim as my invention—

The solution for chemical telegraph-paper, prepared with tincture of logwood, substantially as set forth.

Signed by me this 29th day of September, A. D. 1873.

THOMAS A. EDISON.

Witnesses:
 GEO. T. PINCKNEY,
 CHAS. H. SMITH.